US007231047B2

(12) United States Patent
Feng et al.

(10) Patent No.: US 7,231,047 B2
(45) Date of Patent: Jun. 12, 2007

(54) PRIVATE RETRIEVAL OF DIGITAL OBJECTS

(75) Inventors: Bao Feng, Singapore (SG); Robert Deng Huijie, Singapore (SG); Feng Peirong, San Jose, CA (US)

(73) Assignee: **Agency for Science, Technology and Research (A*STAR)**, Singapore (SG)

(*) Notice: Subject to any disclaimer, the term of this patent is extended or adjusted under 35 U.S.C. 154(b) by 472 days.

(21) Appl. No.: 09/834,106

(22) Filed: Apr. 13, 2001

(65) Prior Publication Data

US 2002/0025043 A1    Feb. 28, 2002

(30) Foreign Application Priority Data

Apr. 13, 2000    (SG)    ............................ 200002034-7

(51) Int. Cl.
*H04L 9/00* (2006.01)
(52) U.S. Cl. ...................................... 380/277; 380/284
(58) Field of Classification Search ................. 380/277
See application file for complete search history.

(56) References Cited

U.S. PATENT DOCUMENTS

| 5,029,207 | A | * | 7/1991 | Gammie | ...................... 380/228 |
| 5,481,613 | A | * | 1/1996 | Ford et al. | ...................... 380/30 |
| 5,604,801 | A | * | 2/1997 | Dolan et al. | ................. 713/159 |
| 5,724,425 | A | * | 3/1998 | Chang et al. | .................. 705/52 |
| 5,855,018 | A | * | 12/1998 | Chor et al. | ...................... 707/9 |
| 6,167,392 | A | * | 12/2000 | Ostrovsky et al. | .............. 707/2 |
| 6,336,121 | B1 | * | 1/2002 | Lyson et al. | ................. 707/201 |
| 6,687,822 | B1 | * | 2/2004 | Jakobsson | ................... 713/156 |
| 6,711,553 | B1 | * | 3/2004 | Deng et al. | .................... 705/57 |
| 6,845,447 | B1 | * | 1/2005 | Fujioka et al. | .............. 713/156 |

OTHER PUBLICATIONS

Y. Gertner, et al., "Protecting Data Privacy in Private Information Retrieval Schemes," Proceedings of the 30th ACM Annual Symposium on Theory of Computing, 21998.
W. Diffie et al., "New Directions in Cryptography," *IEEE Transactions on Information Theory*, vol. IT-22, Nov. 1976, pp. 29-40.
A Meneges, et al., *Handbook of Applied Cryptography*, CRC Press, 1996pp. 15-39.
C. Kaufman, et al., "Hashes and Message Digests," *Network Security—Private Communication In a Public World*, PTR Prentice, 1995, pp. 101-105.

* cited by examiner

*Primary Examiner*—Nasser Moazzami
*Assistant Examiner*—Pramila Parthasarathy
(74) *Attorney, Agent, or Firm*—Morrison & Foerster LLP

(57) ABSTRACT

A database (104) maintains one or more groups (106) of digital objects (202). A user (102) wishes to retrieve one or more digital objects (202) from the database (104), without the database (104) being able to determine which particular digital objects (202) have been retrieved. In addition, the database (104) should not allow the user (102) to retrieve any digital objects (202) to which the user (102) has not been granted access. The user (102) requests the groups (106) containing the digital objects (202) the user (102) wishes to download, but does not identify the digital objects (202) within each group (106) that the user (102) is interested in. Using a symmetric key cryptosystem, the database (104) generates a key (204) for and encrypts each digital object (202) in the requested group (106) into ciphertext (206), and additionally encrypts each key (204). The database (104) transmits the ciphertexts (206) and encrypted keys (208) to the user (102). The user (102) identifies the keys (208) associated with the digital objects (202) of interest, and further encrypts the keys (208), returning the changed keys (506) to the A database (104). The database (104) reverses its encryption of the keys (506), and transmits the partially decrypted keys (510) back to the user (102). The user (102) then applies the user's (102) own decryption algorithm to the keys (510), and then uses the decrypted keys (204) to decrypt the digital objects (202) of interest.

24 Claims, 7 Drawing Sheets

PRIVATE RETRIEVAL OF DIGITAL OBJECTS

TECHNICAL FIELD

The present invention relates generally to secure and private communications enabling retrieval of digital objects from a computerized database.

BACKGROUND ART

The World Wide Web (WWW) has evolved from a service focused on academic areas and offering scientific content into a medium for common users to access information of various origins. While surfing the Web, many users are not aware that a large number of organizations such as those in the marketing industry are gathering their private information. This information is supplemented when a user accesses a Web site, clicks a Web page, makes an electronic purchase, or downloads a file. From all the records and computerized analysis, the information collector can build a digital dossier about the users—what they do, where they go, what they read, what they buy, etc.

There has, therefore, been general recognition of the need for privacy protection on the Internet. One situation in which privacy is a large concern is when databases containing users' personal information are accessed. To illustrate, suppose there is a database that maintains groups of digital objects, and a user wishes to retrieve a subset of the digital objects. Two desirable constraints on database access are as follows:

1) the user can access data the user wants, without disclosing to the database the specific digital objects actually desired; and
2) the user can not get any additional information from the database without the consent of the database.

The first constraint is referred to as user privacy and the second constraint is referred to as database security.

One example that illustrates these concepts is the task of providing electronic newspaper services over the Internet. A database maintains a collection of digital news articles. Assuming that a subscriber request n articles, database security requires that the subscriber gets only n articles, while the user privacy requires that the database cannot determine which n specific articles are retrieved by the subscriber.

The problem of private information retrieval was reviewed by B. Chor, O. Goldreich, E. Kushilevaita, and M. Sudan, "Private Information Retrieval," *Proceedings of the 36th Annual Symposium on Foundations of Computer Science*, pp. 41–50, 1995. The authors were connected with information-theoretical security and proposed solution using multiple databases. However, the security of this solution relies on the assumption that the multiple databases do not communicate with each other, which is not guaranteed to be the case, and is additionally outside of the user's control and ability to independently verify.

Private information retrieval schemes using a single database were later proposed in B. Chor and N. Gilboa, "Computational Private Information Retrieval," *Proceedings of the 29th Annual ACM Symposium on Theory of Computing*, pp. 304–313, 1997, and E. Kushilevita and R. Ostrovsky, "Single-Database Computationally Private Information Retrieval," *Proceeding of the 38th annual Symposium on Foundation of Computer Science*, 1997. These solutions are concerned with security based on computational assumption theory, and in particular the difficulty of factoring large prime numbers, as is done in the well-known RSA encryption scheme. However, the computational costs of these solutions are prohibitively large due to their bit-by-bit processing approach. For example, the scheme in the Kushilevita and Ostrovsky reference requires a computational cost on the order of O(N) multiplication modulo a 1024-bit number just to retrieve 1 bit of information, where N is the number of bits of data maintained by the database.

The requirement of database security in the context of private information retrieval was studied in Y. Gertner, Y. Ishai, E. Kushilevita and T. Malkin, "Protecting Data Privacy in Private Information Retrieval Schemes," *Proceedings of the 30th ACM Annual Symposium on Theory of Computing*, 1998.

All of the proposed solutions to the problem of private information retrieval described above employ the bit-by-bit processing approach. Therefore, they have only theoretical values, and are not feasible in practical applications, because of the time that would be required to solve each problem.

Therefore, what is needed is a way of allowing a user to achieve information retrieval from a database in an efficient manner while maintaining privacy.

DISCLOSURE OF INVENTION

In accordance with the present invention, there is provided a way to allow a user (102) to achieve private information retrieval from a database (104) in an efficient manner. The database (104) maintains one or more groups (106) of digital objects (202) available for users to access. A user (102) can retrieve a subset of digital objects (202) from a group (106) of digital objects (202) in the database (104) such that:

1) the user can access the data (202) the user (102) wants, without disclosing to the database (104) the specific digital objects (202) actually desired; and
2) the user (102) can not access additional information (202) from the database (104) without the consent of the database (104).

Objects (202) in the database (104) are stored in one or more different groups (106). The user (102) identifies some particular objects (202) of interest in the database (104), and additionally to which groups (106) those objects (202) belong. The user (102) then sends (302) a request to the database (104), specifying only the groups (106) containing the desired objects (202), but does not specifically identify the particular digital objects (202) desired. At his point, an electronic commerce transaction might take place, where the user (102) pays for access to a specified number of digital objects (202). The database (104) then encrypts (304) all digital objects (202) in each requested group (106) into ciphertext (206). In addition, a key (204) for each ciphertext (206) is encrypted (306). The database (104) then sends back (308) to the user (102) both the ciphertexts (206) and the associated encrypted keys (208).

At this point, the database (104) knows only that the user (102) desires one or more digital objects (202) from a particular group (106) of digital objects in the database (104), but is unable to determine which particular objects (202) are of interest.

The user identifies (310) the ciphertexts (206) of the desired digital objects (202), and their associated keys (208). Next, the user re-encrypts (312) the identified keys (208), and returns (314) the re-encrypted keys (506) to the database (104). The database decrypts (316) the keys (506) to the extent that it is able—i.e., the database (104) reverses the encryption it previously applied to those keys (506). However, the database (104) is unable to identify which digital objects (202) the keys (506) are associated with, because the keys (512) remain encrypted with the user's encryption scheme. The database (104) now sends (318) the keys (512) back to the user (102).

Once the user (102) receives the keys (512) back from the database (104), the next step is simply to decrypt (320) them using the user's own decryption scheme (604), thus revealing the unencrypted keys (204). Finally, the user (102) uses those keys (204) to decrypt (322) the appropriate digital object ciphertexts (206).

Since the database (104) is unable to determine which keys (204) it has decrypted, user (102) privacy is maintained. And, since the user (102) cannot gain access to any key (204) unless the database (104) first decrypts it, the user (102) will not be able to access any more objects (202) than are authorized. Thus, both constraints discussed above have been satisfied.

The present invention does not require multiple databases. Processing is digital object (202) oriented instead of bit oriented. User (102) privacy is guaranteed without any computational constraint and without additional constraints on the "honesty" of the database (104). This means that the user's interest in specific digital objects (202) is not disclosed. The security of the database (104) is based on the assumption of the intractability of computing discrete logarithms, which forms the basis of many existing digital signature schemes and the Diffie-Hellman key exchange protocol. See W. Diffie and M. Hellman, "New directions in cryptography," *IEEE Transactions on Information Theory*, Vol. IT-22, No. 6, pp. 644–654, November 1976.

The present invention also provides a balance between user (102) privacy and communication cost. Communication cost can be reduced by decreasing the size of a digital object group (106), while a large digital object group (106) size gives better user (102) privacy protection.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

A cryptographic system, or cryptosystem, has an encryption key to convert plaintext into ciphertext and a decryption key to recover the plaintext from ciphertext. If the encryption key and the decryption key are identical, the cryptosystem is called a symmetric key cryptosystem. If the encryption key and the decryption key are different and it is computationally infeasible to determine the decryption key from the mathematically-related encryption key, the cryptosystem is called an asymmetric key cryptosystem, or a public key cryptosystem. For illustrative purposes, the preferred embodiments described here make reference to symmetric key cryptosystems for encryption and decryption. It will be apparent to those skilled in the art, however, that asymmetric key cryptosystems could also be used. See, for example, A. Menezes, P. Oorschot, and S. Vanstone, *Handbook of Applied Cryptography,* CRC Press, 1996, or C. Kaufman, R. Perlman, and M. Speciner, *Network Security-Private Communication in A Public World,* PTR Prentice Hall, Englewoor Cliffs, N.J., 1995.

For purposes of clarity, we use $e(k, m)$ to denote encryption of a digital object m with key k in a symmetric key cryptosystem; and $d(k, c)$ to denote the decryption of a ciphertext c with key k in a symmetric key cryptosystem.

Figure 1:
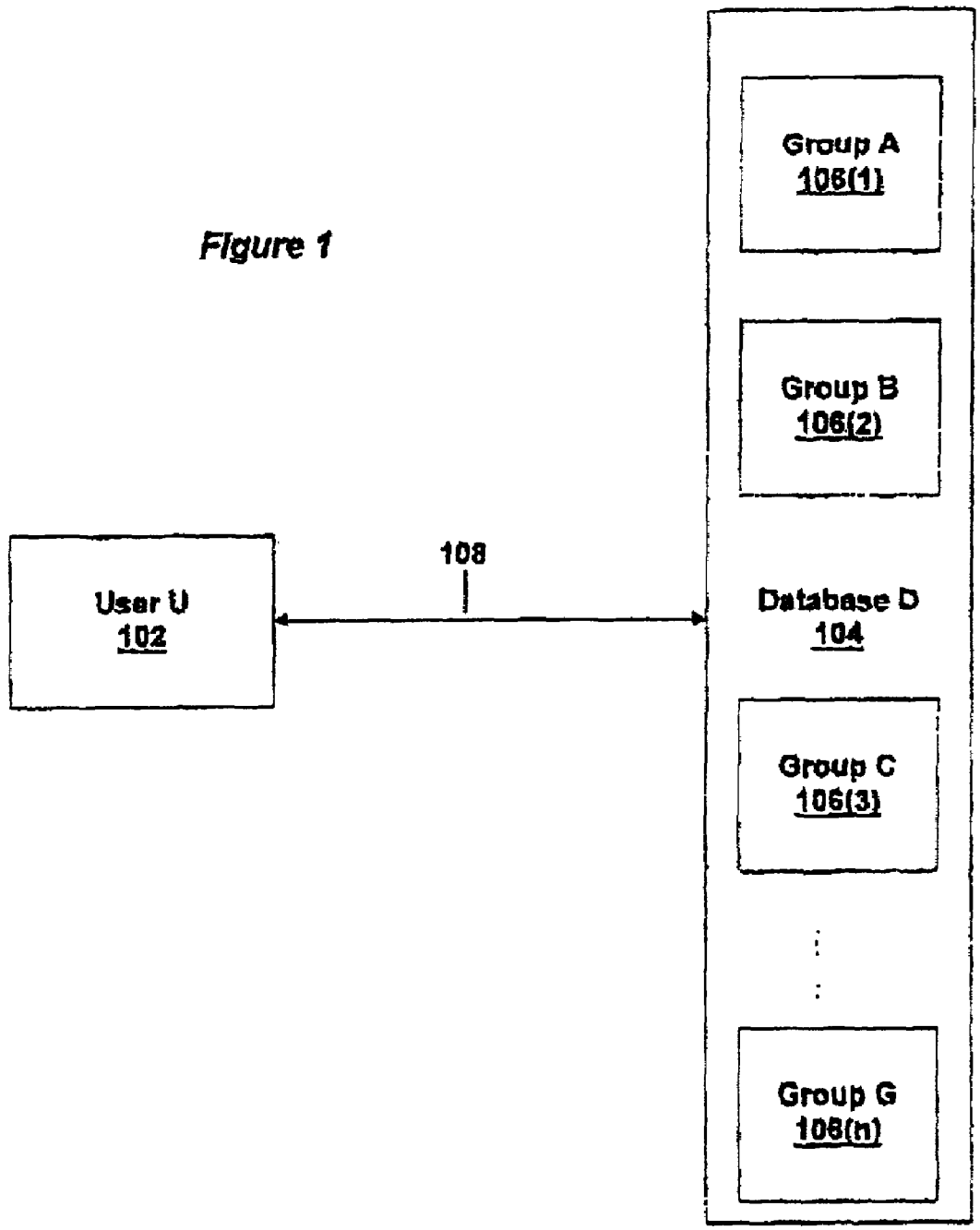
FIG. 1 is a block diagram of a data access system between a (102) user and a database (104).

FIG. 1 is a model of a data access system between a user 102 and a database 104. The system contains a user 102, and a database 104. The database 104 maintains groups 106 of digital objects m 202. The user 102 wishes to access digital objects 202 in the database 104 by subscribing to the database's service, or by paying the database 104 with electronic cash, or by other means as required by the database 104. A connection 108 between the user 102 and the database 104 could be any standard communication media, such as the Internet or other wide area network. Further, the database 104 maintains one or more groups 106 of digital objects m, and the user 102 is interested in retrieving digital objects 202 from the group of N digital objects $\{m, i=1, 2, \ldots, N\}$ 106 in the database 104. In FIG. 1, the illustrated database 104 contains Groups A through G; however it will be appreciated that the present invention is applicable to a database 104 containing any number of groups 106. It should also be noted that the particular manner in which the user 102 discovers the desired group 106 is not material to the present invention. All that is required is that the user 102, either directly or through the use of client software operated by the user 102, be aware of the digital object 202 the user wants, and the group 106 in which that object 202 is located.

Figure 2:
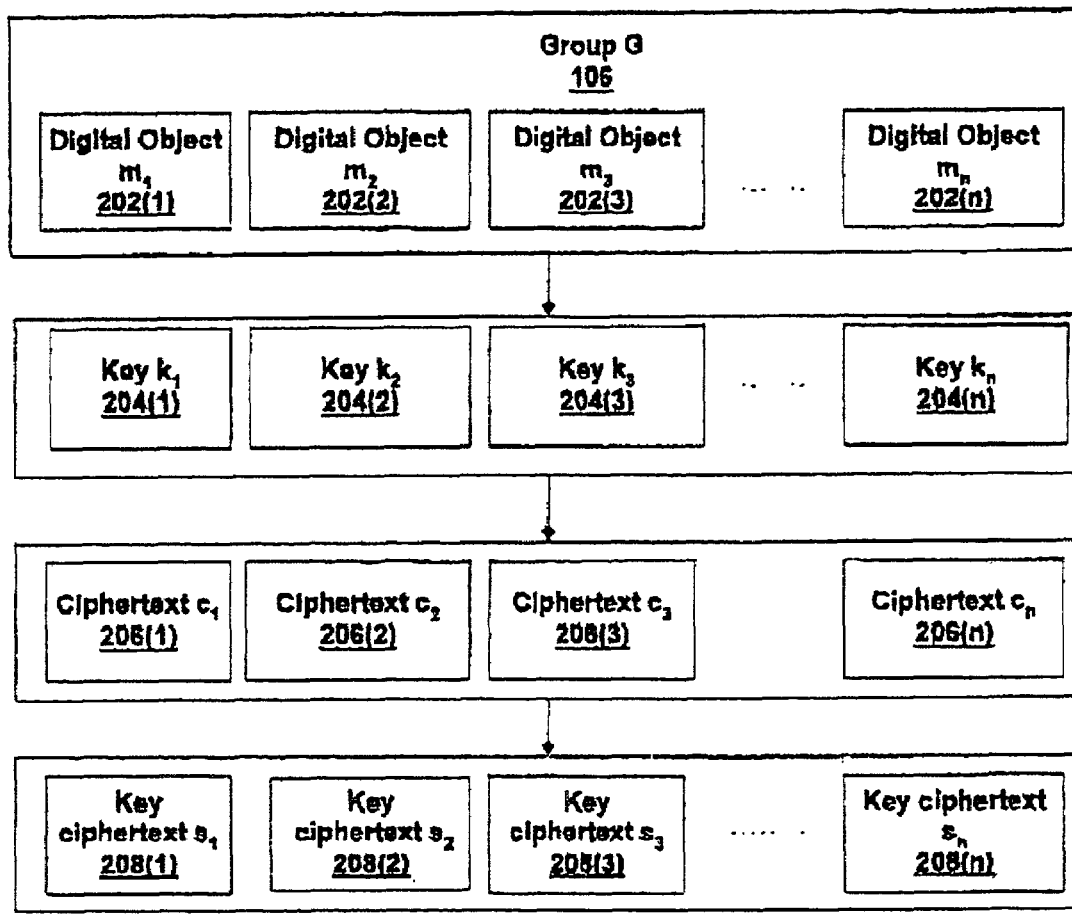
FIG. 2 is a block diagram of digital objects (202) inside a group (106), and corresponding keys (204), ciphertexts (206), and key ciphertexts (208) associated with the digital objects (202).

FIG. 2 is a block diagram of a group 106 of digital objects 202 contained within the database 104. A group 106 contains one or more digital objects 202. The number of digital objects 202 in a group 106 is determined by the operator/maintainer of the database 104, and may be determined by factors not within the scope of the present invention. For purposes of the present invention, however, it will be noted from the description that decreasing the size of a group 106 reduces communication cost, but also decreases privacy protection for the user 102. Initially, encryption is performed upon all objects 202 in the group 106, as indicated below. Thus, each digital object 202 in the group 106 will have a ciphertext 206 and a key 204, and each key 204 will additionally have an associated ciphertext 208.

Figure 3:
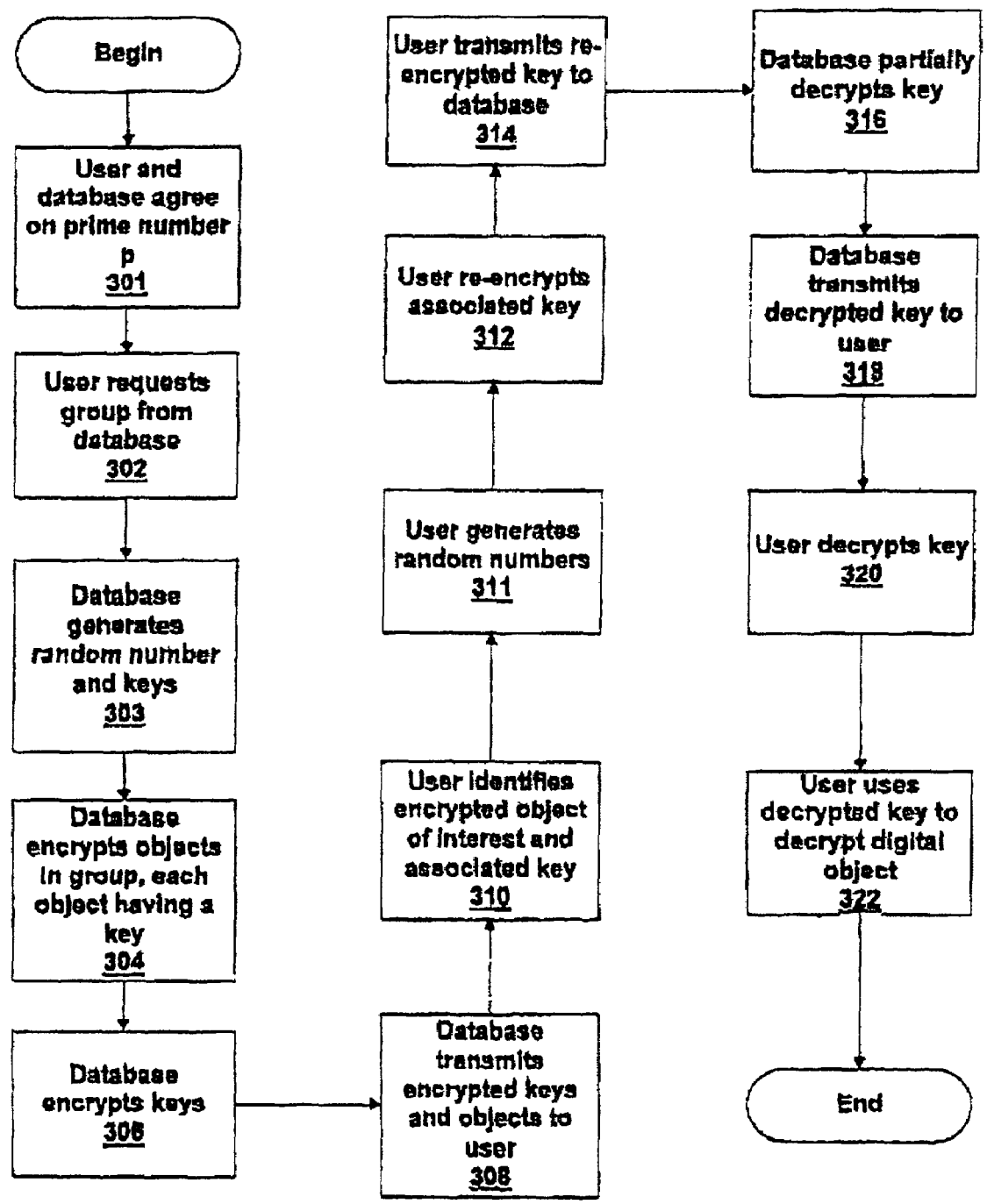
FIG. 3 is a flowchart of the operation of the illustrative embodiment of the present invention.

FIG. 3 shows a flowchart of the operation of a preferred embodiment of the present invention. The database 104 and user 102 have agreed on some prime number p, such that p=vq+1, where q is a large prime number, for example 160 bits in length, and v is a large integer, for example 800 bits in length. The prime number q is chosen such that p will be prime as well. When the user 102 wants to retrieve digital objects 202 from the group 106, the user 102 sends 302 a request and optionally the corresponding payment to the database 104. Upon receipt of the request, the database 104 generates 303 a random number R, 0<R<p−1, and N keys $k_i$, i=1, 2, ..., N, for a symmetric key cryptosystem in a fashion well known in the art. One key k is associated with each digital object m. The database then encrypts 304 each digital object $m_i$ 202 in the group 106 with $k_i$, 204 using the symmetric key cryptosystem to obtain ciphertext $c_i$=e ($k_i$, $m_i$), i=1, 2, ..., N 206. Finally, the database 104 encrypts 306 the keys 204 themselves to obtain $s_i = k_i^R \mod p$, i=1, 2, ..., N 208.

The database 104 next transmits 308 the encrypted objects 206 and keys 208 ($c_i$, $s_i$), i=1, 2, ..., N to the user 102. Assuming that the user 102 intends to retrieve n, n<N, digital objects $m_{i1}, m_{i2}, \ldots, m_{in}$ 202 from the group 106, the user 102 identifies 310 the objects 206 and keys 208 desired, and generates 311 n random numbers $w_j$, 0<$w_j$<p−1, and then obtains 312 n re-encrypted keys $W_j = s_{ij}^{wj} \mod p$, j=1, 2, ..., n. The user 102 sends 314 $W_j$, j=1, 2, ..., n and optionally the required payment to the database 104. The database 104 computes 316 and sends 318 $U_j = W_j^{1/r \mod(p-1)} \mod p$, j=1, 2, ..., n, back to the user 102.

The user 102 computes 320 $k_{ij} = U_j^{1/wj \mod(p-1)} \mod p$, j=1, 2, ..., n, and then decrypts $c_{ij}$ with $k_{ij}$ using the symmetric key cryptosystem to recover digital objects $m_{ij} = d(k_{ij}, c_{ij})$, j=1, 2, ..., n 202.

Figure 4:
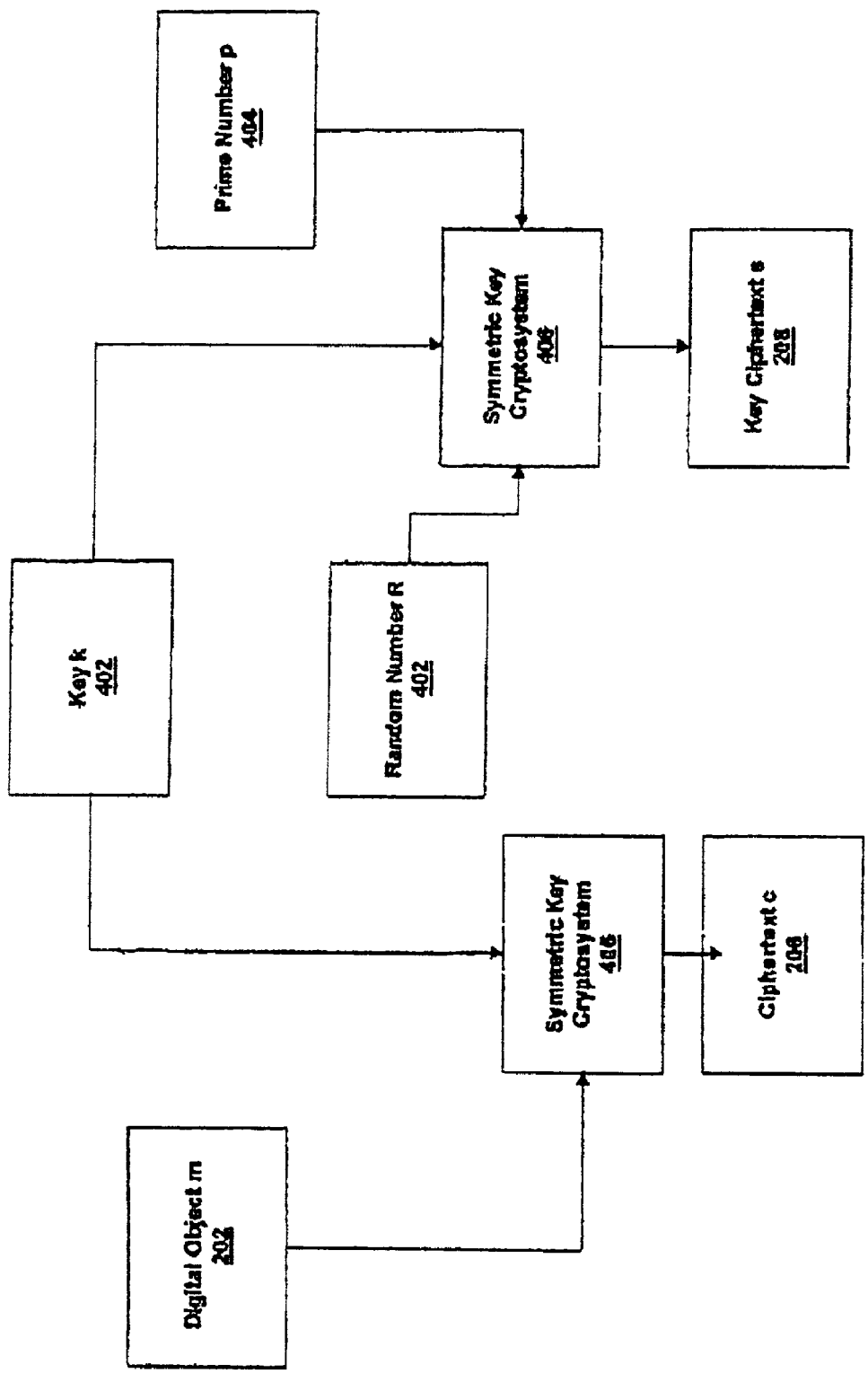
FIG. 4 is a block diagram illustrating the encryption of digital objects (202) into ciphertext (206), and of keys (204) into key ciphertexts (208).

FIG. 4 is a block diagram that further illustrates the encryption performed on a digital object 202 by the database 104. The digital object 202 and its associated key 204 are provided to the cryptosystem 406, to produce the ciphertext 206, e($k_i$, $m_i$). Similarly, using a prime number p 404, the key 204 and random number R 402, the key 204 itself is encrypted into ciphertext 208 via the cryptosystem 406.

Figure 5A:
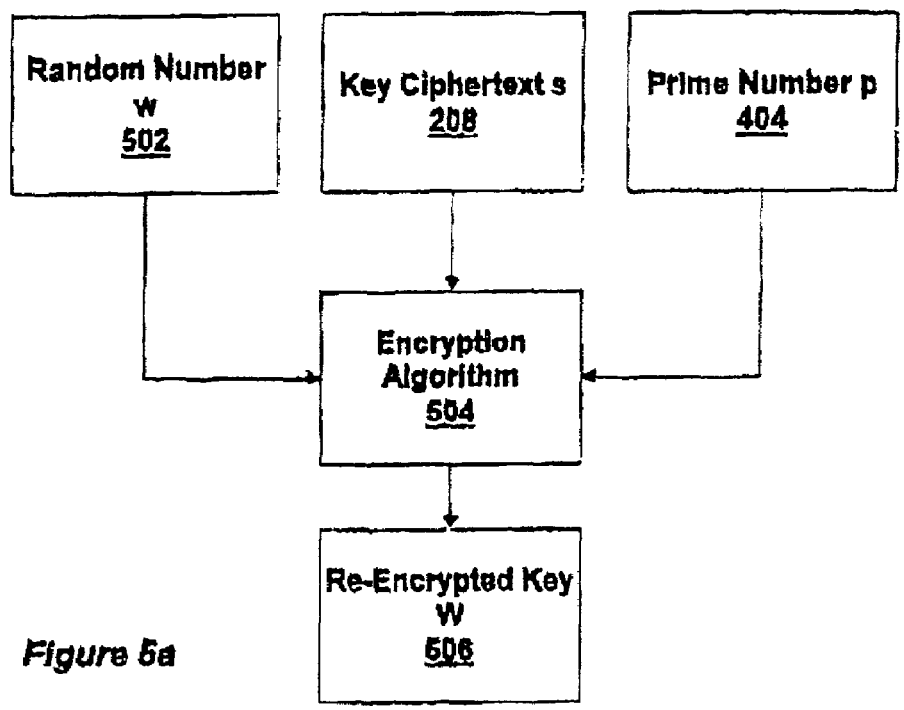
FIGS. 5a and 5b are block diagrams illustrating, respectively, the re-encryption of a ciphertext key (208), and the partial decryption of such a key (208).

FIG. 5a is a block diagram illustrating the process carried out by the user 102 of re-encrypting 312 the key 204. In addition to the key ciphertext 208, a prime number p 404 and random number w 502 are processed through the encryption algorithm ($s_{ij}^{wj} \mod p$, as described above) 504 to obtain thee re-encrypted key 506.

Figure 5B:
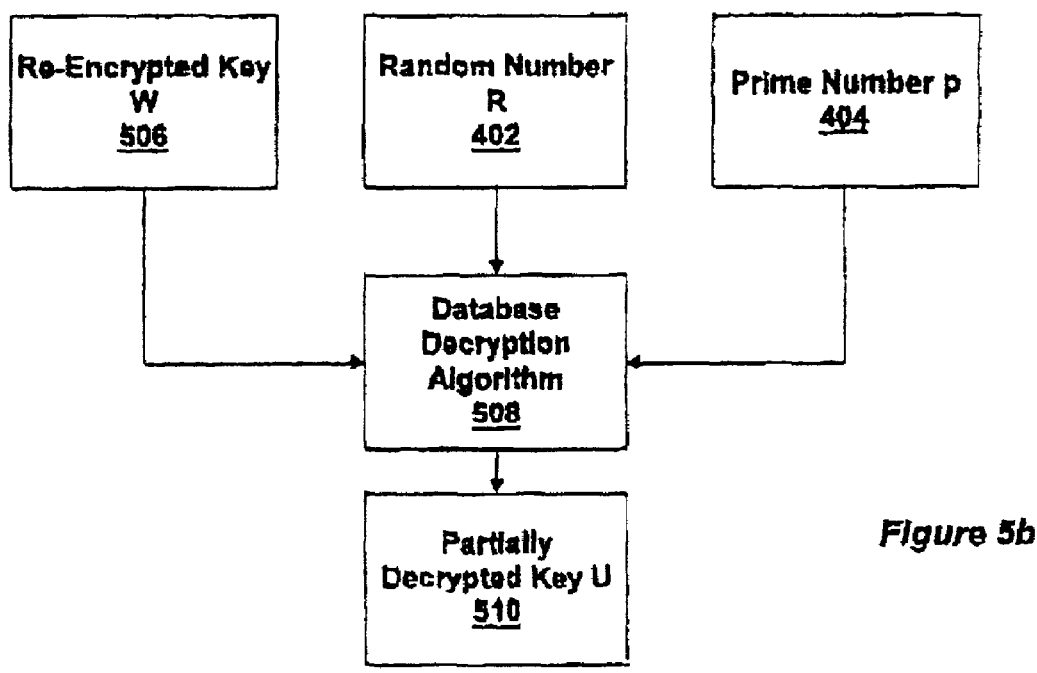

Similarly, FIG. 5b illustrates the partial decryption 314 performed by the database 104 on the re-encrypted key 506. Using the previously-generated random number R 402 and prime number p 404, the re-encrypted key 506 is then decrypted 314 using the decryption algorithm ($W_j^{1/r \mod(p-1)} \mod p$) 508 to obtain the partially decrypted key U 510.

Figure 6A:
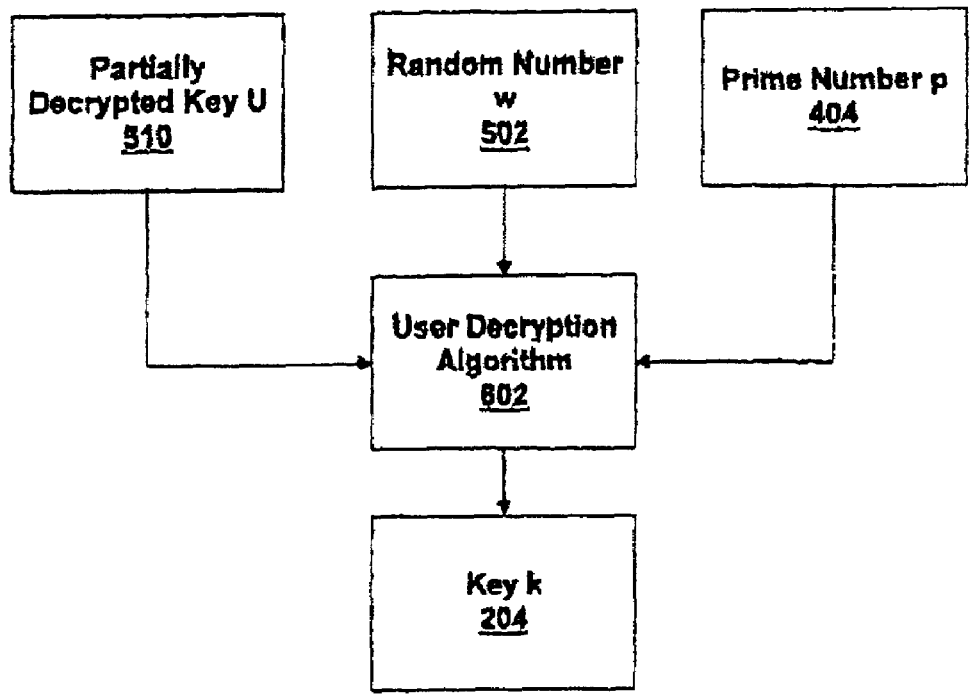
FIGS. 6a and 6b are block diagrams illustrating, respectively, the decryption of a key (512), and the decryption of a digital object ciphertext (206) using a key (204).

FIG. 6a illustrates the step of transforming the partially decrypted key U 510 into the unencrypted key K 204. The partially decrypted key U 510, the random number w 502, and prime number p 404 are input into the use decryption algorithm ($U_j^{1/wj \mod(p-1)} \mod p$) 602, thus revealing the unencrypted key K 204.

Figure 6B:
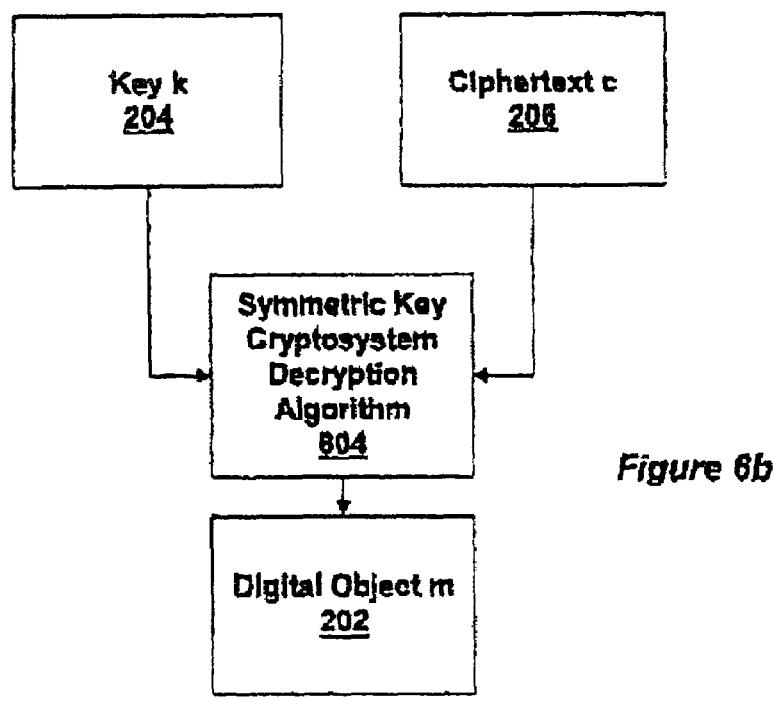

Then, as shown in FIG. 6b, key k 204 and ciphertext c 206 are input into the cryptosystem decryption algorithm (d($k_{ij}$, $c_{ij}$)) 604 to obtain the digital object m 202.

Figure 7:
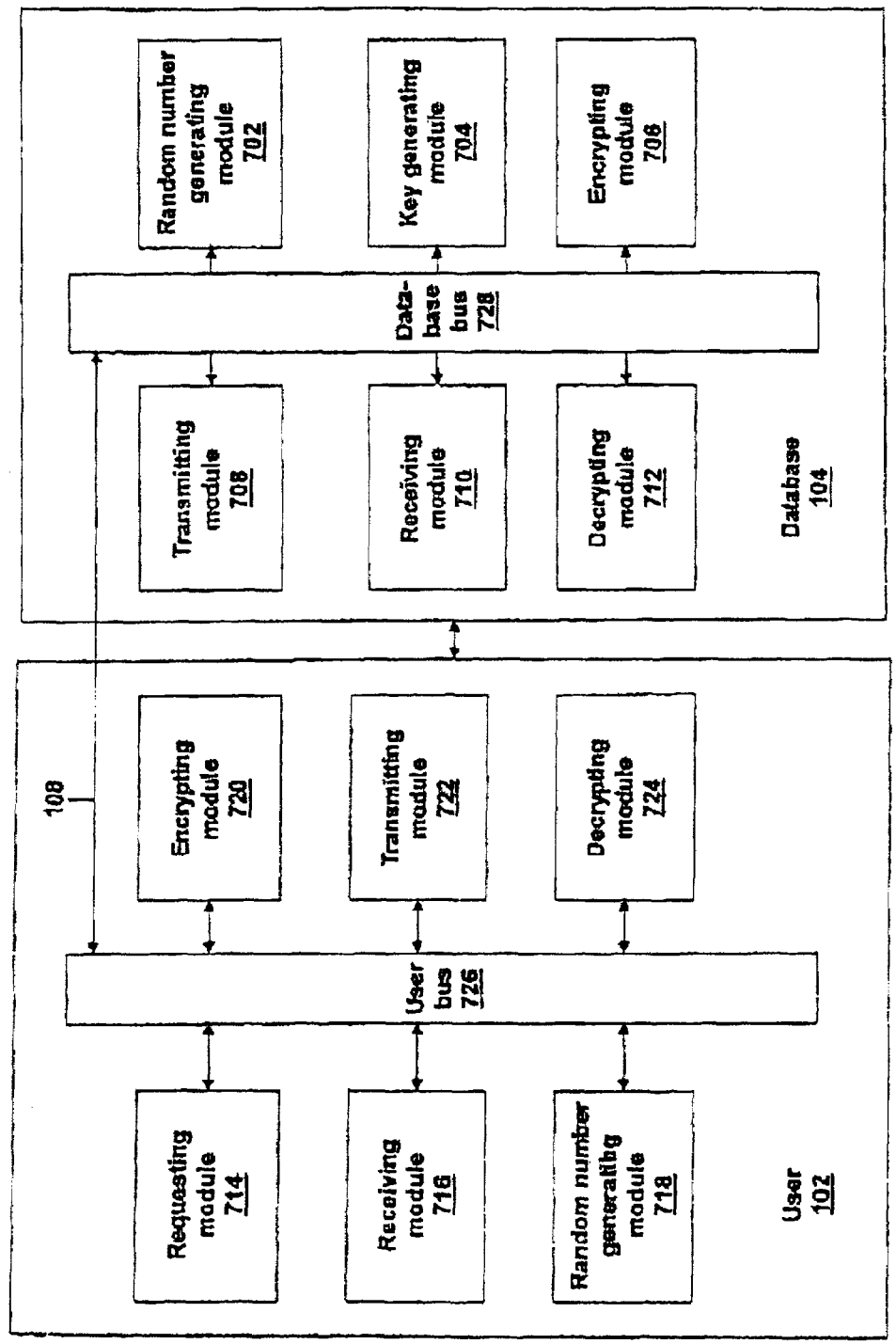
FIG. 7 is a block diagram of an apparatus that is a preferred embodiment of the present invention.

FIG. 7 is a block diagram of an apparatus that is a preferred embodiment of the present invention. Note that the apparatus can be implemented either as hardware, firmware, or software. The user 102 has a user bus 726 through which each of the user modules communicate. Similarly, the database 104 has a database bus 728. The user bus 726 and database bus 728 communicate via connection 108. The user 102 requests a group from the database 104 using the requesting module 714. The user generates random numbers using the random number generating module 718. Transmissions from the database 104 to the user 102 are received by the receiving module 716. Data is sent from the user 102 to the database 104 via the transmitting module 722. User 102 encryption is performed by the encrypting module 720, and user 102 decryption by the decryption module 724.

Focusing on the database 104 modules illustrated in FIG. 7, the database 104 generates random numbers using the random number generating module 702. Transmissions from the user 102 to the database 104 are received by the receiving module 710. Transmissions from the database 104 to the user 102 are sent by the transmitting module 708. The database 104 also has a key generating module 704 for generating keys 204, an encrypting module 706, and a decrypting module 712.

Security Considerations:

First, it can be easily seen from this description that the user 102 can obtain the desired digital objects $m_{ij}$ 202 by decrypting ciphertexts $c_{ij}$ 206 with computes $k_{ij} = U_j^{1/wj \mod(p-1)} \mod p$, j=1, 2, ..., n. That is, if both the database 104 and user 102 follow the protocol, the user 102 gets the desired information. However, under no circumstances is the database 104 able to pinpoint which digital objects 202 are being retrieved by the user 102. In order for the database 104 to find out which digital object 202 the user 102 is interested in retrieving, the database 104 would need to figure out which $s_{ij}$ 208 is being used to compute $W_j = s_{ij}^{wj} \mod p$ 506 by the user 102. However, the only information available to the database 104 is $W_j = s_{ij}^{wj} \mod p$, 1, 2, ..., n and $s_{ij}$, i=1, 2, ..., N. Since $w_j$'s are randomly chosen and kept secret by the user 102, it is equally likely that all $s_{ij}$'s 208 are being used in computing $W_j = s_{ij}^{wj} \mod p$, j=1, 2, ..., n. Therefore, the user's privacy is satisfied without having to rely on any computational assumptions.

Next, we consider database 104 security. Without loss of generality, assume that the user 102 has paid and retrieved $m_1, m_2, \ldots, m_j$ 202. The user 102 then tries to recover $m_{j+1}$, which the user 102 is not authorized to access, without the database's 104 help. This problem is equivalent to, given $s_1$ 208(1), $k_1$ 204(1), $s_2$ 208(2), $k_2$ 204(2), ..., $s_j$, $k_j$, and $s_{j+1}$, finding $k_{j+1}$ such that $s_{j+1} = k_{j+1}^R \mod p$. One approach to solving this problem is to find R 402 from, for example, $s^j = k_j^R \mod p$ and then compute $k_{j+1} = s_{j+1}^{1/R(p-1)} \mod p$. But this is equivalent to solving the discrete logarithm problem, and is therefore not feasible. The second approach is to express $s_{j+1}$ in terms of multiplication or division of $s_1$, $s_2$, ..., $s_j$. Then $k_{j+1}$ can be found from a corresponding expression in terms of $k_1$, $k_2$, ..., $k_j$. However, since $k_1$, $k_2$, ..., $k_j$ and $k_{j+1}$ are all independently and randomly chosen, finding the relationship between the $s_j$'s is also not computationally feasible.

Finally, digital objects 202 are encrypted with a symmetric key cryptosystem and the encryption keys 204 are protected using large exponentiations. To recover the digital objects 202 from the ciphertexts 206, an eavesdropper must be able to break the symmetric key cryptosystem or solve the discrete logarithm problem. Both are computationally infeasible for well-designed ciphers and exponentiations with large prime modulus.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for selecting a digital object in a database, the method comprising:
   generating a plurality of encryption keys, each encryption key associated with one of a plurality of digital objects stored in an electronic database;
   encrypting the plurality of digital objects using the associated encryption keys;
   encrypting the plurality of encryption keys by the database;
   transmitting to a requester the plurality of encrypted digital objects and encryption keys;
   receiving from the requester at least one of the encryption keys, wherein the received encryption key has been re-encrypted by the requester prior to transmission;
   generating a partially decrypted encryption key at the database by decrypting the received encryption key; and
   transmitting the partially decrypted encryption key to the requester.

2. The method of claim 1, further comprising encrypting the plurality of encryption keys by determining (encryption key)$^{(random\ number\ R)}$ mod (prime number p) for each key.

3. The method of claim 2, further comprising performing the modulo operation if computation of a discrete logarithm is not possible.

4. The method of claim 1, further comprising decrypting the received encryption key by determining (encryption key)$^{(1/(random\ number\ R)\ mod\ (prime\ number\ p)-1)}$ mod (prime number p).

5. A method for selecting a digital object in a database, the method comprising:
   requesting a plurality of digital objects from an electronic database;
   receiving from the database the requested plurality of digital objects, wherein each digital object has been encrypted using an associated encryption key;
   receiving from the database plurality of keys associated with the plurality of digital objects wherein each key has been encrypted by the database;
   selecting a ciphertext key from the plurality of received keys;
   re-encrypting the selected ciphertext key;
   transmitting the re-encrypted ciphertext key to the database;
   receiving from the database the key wherein the key has been partially decrypted by the database;
   decrypting the partially decrypted key using the second cryptography scheme to generate a decrypted key; and
   decrypting the received digital object using the decrypted key.

6. The method of claim 5, further comprising encrypting the plurality of encryption keys by determining (encryption key)$^{(random\ number\ R)}$ mod (prime number p) for each key.

7. The method of claim 6, further comprising performing the modulo operation if computation of a discrete logarithm is not possible.

8. The method of claim 5, further comprising decrypting the received encryption key by determining (encryption key)$^{(1/(random\ number\ R)\ mod\ (prime\ number\ p)-1)}$ mod (prime number p).

9. A system for selecting a digital object in a database, the system comprising a processor for:
   generating a plurality of encryption keys, each encryption key associated with one of a plurality of digital objects stored in an electronic database;
   encrypting the plurality of digital objects using the associated encryption keys;
   encrypting the plurality of encryption keys;
   transmitting to a requester the plurality of encrypted digital object and encryption keys;
   receiving from the requester at least one of the encryption keys, wherein the received encryption key has been re-encrypted by the requester prior to transmission;
   generating a partially decrypted encryption key by decrypting the received encryption key using the first cryptography scheme; and
   transmitting the partially decrypted encryption key to the requester.

10. The system of claim 9, wherein the processor is further configured or arranged for encrypting the plurality of encryption keys by determining (encryption key)$^{(random\ number\ R)}$ mod (prime number p) for each key.

11. The system of claim 10, wherein the processor is further configured or arranged for performing the modulo operation if computation of a discrete logarithm is not possible.

12. The system of claim 9, wherein the processor is further configured or arranged for decrypting the received encryption key by determining (encryption key)$^{(1/(random\ number\ R)\ mod\ (prime\ number\ p)-1)}$ mod (prime number p).

13. A system for selecting a digital object in a database, the system comprising a processor for:
   requesting a plurality of digital objects from an electronic database;
   receiving from the database the requested plurality of digital objects, wherein each digital object has been encrypted using an associated encryption key;
   receiving from the database plurality of keys associated with the plurality of digital objects wherein each key has been encrypted by the database;
   selecting a ciphertext key from the plurality of received keys;
   re-encrypting the selected ciphertext key;
   transmitting the re-encrypted ciphertext key to the database;
   receiving from the database the key wherein the key has been partially decrypted by the database;
   decrypting the partially decrypted key using the second cryptography scheme to generate a decrypted key; and
   decrypting the received digital object using the decrypted key.

14. The system of claim 13, wherein the processor is further configured or arranged for encrypting the plurality of encryption keys by determining (encryption key)$^{(random\ number\ R)}$ mod (prime number p) for each key.

15. The system of claim 14, wherein the processor is further configured or arranged for performing the modulo operation if computation of a discrete logarithm is not possible.

16. The system of claim 13, wherein the processor is further configured or arranged for decrypting the received encryption key by determining (encryption key)$^{(1/(random\ number\ R)\ mod\ (prime\ number\ p)-1)}$ mod (prime number p).

17. A machine-readable medium having program code stored thereon which, when executed by a machine, causes the machine to perform a method for selecting a digital object in a database, the method comprising:
   generating a plurality of encryption keys, each encryption key associated with one of a plurality of digital objects stored in an electronic database;
   encrypting the plurality of digital objects using the associated encryption keys;

encrypting the plurality of encryption keys by the database;

transmitting to a requester the plurality of encrypted digital objects and encryption keys;

receiving from the requester at least one of the encryption keys, wherein the received encryption key has been re-encrypted by the requester;

generating a partially decrypted encryption key at the database by decrypting the received encryption key; and transmitting the partially decrypted encryption key to the requester.

18. The machine-readable medium of claim 17, wherein the method further comprises encrypting the plurality of encryption keys by determining (encryption key)$^{(random\ number\ R)}$ mod (prime number p) for each key.

19. The machine-readable medium of claim 18, wherein the modulo operation is performed if computation of a discrete logarithm is not possible.

20. The machine-readable medium of claim 17, wherein the method further comprises decrypting the received encryption key by determining (encryption key)$^{(1/(random\ number\ R)\ mod\ (prime\ number\ p)-1)}$ mod (prime number p).

21. The machine-readable medium of claim 20, wherein the method further comprises performing the modulo operation if computation of a discrete logarithm is not possible.

22. A machine-readable medium having program code stored thereon which, when executed by a machine, causes the machine to perform a method for selecting a digital object in a database, the method comprising:

requesting a plurality of digital objects from an electronic database;

receiving from the database the requested plurality of digital objects, wherein each digital object has been encrypted using an associated encryption key;

receiving from the database plurality of keys associated with the plurality of digital objects wherein each key has been encrypted by the database;

selecting a ciphertext key from the plurality of received keys;

re-encrypting the selected ciphertext key;

transmitting the re-encrypted ciphertext key to the database;

receiving from the database the key wherein the key has been partially decrypted by the database;

decrypting the partially decrypted key using the second cryptography scheme to generate a decrypted key; and decrypting the received digital object using the decrypted key.

23. The machine-readable medium of claim 22, wherein the method further comprises encrypting the plurality of encryption keys by determining (encryption key)$^{(random\ number\ R)}$ mod (prime number p) for each key.

24. The machine-readable medium of claim 22, wherein the method further comprises decrypting the received encryption key by determining (encryption key)$^{(1/(random\ number\ R)\ mod\ (prime\ number\ p)-1)}$ mod (prime number p).

* * * * *